(12) United States Patent
Watanabe et al.

(10) Patent No.: US 9,829,652 B2
(45) Date of Patent: Nov. 28, 2017

(54) CONNECTOR STRUCTURE AND CONNECTOR CONNECTION STRUCTURE

(71) Applicant: FURUKAWA ELECTRIC CO., LTD., Tokyo (JP)

(72) Inventors: Kengo Watanabe, Tokyo (JP); Tsunetoshi Saito, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/134,343

(22) Filed: Apr. 20, 2016

(65) Prior Publication Data
US 2016/0231511 A1    Aug. 11, 2016

Related U.S. Application Data

(63) Continuation of application No. PCT/JP2014/078752, filed on Oct. 29, 2014.
(Continued)

(51) Int. Cl.
*G02B 6/38* (2006.01)
*G02B 6/04* (2006.01)
(Continued)

(52) U.S. Cl.
CPC ....... *G02B 6/3885* (2013.01); *G02B 6/02042* (2013.01); *G02B 6/04* (2013.01);
(Continued)

(58) Field of Classification Search
CPC .. G02B 6/3885; G02B 6/3863; G02B 6/3882; G02B 6/02042; G02B 6/403; G02B 6/04
See application file for complete search history.

(56) References Cited

U.S. PATENT DOCUMENTS 6,835,001 B1* 12/2004 Iwaya .................. G02B 6/3873
385/53
9,360,634 B2* 6/2016 Czosnowski ........ G02B 6/3834
(Continued)

FOREIGN PATENT DOCUMENTS

JP          8-126951        5/1996
JP      2002-18690 A       1/2002
(Continued)

OTHER PUBLICATIONS

International Search Report dated Nov. 25, 2014, in International Application No. PCT/JP2014/078752.

*Primary Examiner* — John M Bedtelyon
(74) *Attorney, Agent, or Firm* — Hauptman Ham, LLP

(57) ABSTRACT

In the present invention, a connector structure comprises a multi-core fiber and a ferrule. The multi-core fiber comprises a plurality of cores and a cladding that surrounds the cores. The ferrule holds the multi-core fiber. A tip of the multi-core fiber protrudes from an end face of the ferrule. A relation $\Delta \leq 14.8/a$ is satisfied. In the formula, $\Delta$ ($\mu$m) is a difference between a maximum protrusion height and a minimum protrusion height from an end face of the ferrule in a reference circle at the tip of the multi-core fiber. The reference circle is a minimum circle that includes all mode field diameters of the plurality of the cores having a center of cross section of the multi-core fiber as its center. And a ($\mu$m) is a radius of the reference circle.

11 Claims, 16 Drawing Sheets

Related U.S. Application Data

(60) Provisional application No. 61/896,903, filed on Oct. 29, 2013.

(51) Int. Cl.
*G02B 6/40* (2006.01)
*G02B 6/02* (2006.01)

(52) U.S. Cl.
CPC ......... *G02B 6/3863* (2013.01); *G02B 6/3882* (2013.01); *G02B 6/403* (2013.01)

(56) References Cited

U.S. PATENT DOCUMENTS

| | | |
|---|---|---|
| 2011/0229086 A1 | 9/2011 | Bradley et al. |
| 2012/0051706 A1 | 3/2012 | Van Geffen et al. |
| 2015/0205053 A1* | 7/2015 | Aoki .................. G02B 6/3877 385/61 |

FOREIGN PATENT DOCUMENTS

| | | |
|---|---|---|
| JP | 2013-522679 A | 6/2013 |
| JP | 2013-522680 A | 6/2013 |
| JP | 2013-536954 A | 9/2013 |
| WO | 2011/116133 A1 | 9/2011 |

* cited by examiner

CONNECTOR STRUCTURE AND CONNECTOR CONNECTION STRUCTURE

RELATED APPLICATIONS

The present application is a continuation of International Application Number PCT/JP2014/078752, filed Oct. 29, 2014, which claims benefit of U.S. Provisional Application No. 61/896,903, filed Oct. 29, 2013, the disclosures of which applications are hereby incorporated by reference herein in their entirety.

TECHNICAL FIELD OF THE INVENTION

This invention relates to a connector structure having a plurality of multi-core fibers and the like.

BACKGROUND OF THE INVENTION

Due to rapidly increasing traffic in optical communications in recent years, the transmitting capacity of presently used single-core optical fibers is approaching its limit. So, as a means to further expand the communication capacity, multi-core fibers in which a plurality of cores are formed in one fiber have been proposed. Use of multi-core fibers can suppress the laying cost of optical fibers and expand the transmission capacity.

If a multi-core fiber is used as a transmission path, each of the core parts of the multi-core fiber needs to be connected to another multi-core fiber, an optical element, or the like respectively to send and receive transmission signals.

As a connector using such a multi-core fiber, there is a connector in which positioning in rotational direction is considered for example (Patent Document 1).

RELATED ART

Patent Document

[Patent Document 1] Published Japanese Translation of PCT International Publication for Patent Application No. 2013-522679 (JP-T-2013-522679)

SUMMARY OF THE INVENTION

Problems to be Solved by the Invention

In the connection of such multi-core fibers, it is necessary that all cores of the multi-core fibers are optically connected by physical contact. However, if a multi-core fiber is polished for protrusion at the tip part of a connector, the end face of the multi-core fiber may become a curved surface (a part of a spherical surface). In this case, although it may be possible to secure required pressing force for a center core against a core of the multi-core fiber of connection target, it may not be possible to secure required pressing force for surrounding cores to be pressed with each other.

The present invention was achieved in view of such problems. Its object is to provide a connector structure and the like in which physical contact with a connection target with certainty is possible.

Means for Solving Problems

To achieve the above object, a first invention is a connector structure comprising a multi-core fiber, which comprises a plurality of cores and a cladding that surrounds the cores, and a ferrule that holds the multi-core fiber. A tip of the multi-core fiber protrudes from an end face of the ferrule and a relation $\Delta \leq 14.8/a$ is satisfied, wherein $\Delta$ (µm) is a difference between a maximum protrusion height and a minimum protrusion height from an end face of the ferrule in a reference circle at the tip of the multi-core fiber. The reference circle is a minimum circle that includes all mode field diameters of the plurality of the cores having the center of cross section of the multi-core fiber as its center. a (µm) is a radius of the reference circle.

According to the first invention, required pressing force can be secured with certainty for all the connection target cores since the relation $\Delta \leq 14.8/a$ is satisfied, where $\Delta$ is a difference between the protrusion margin at the position in which the tip of the multi-core fiber is protruded at the most in the reference circle and the protrusion margin at the part in which the protrusion margin of the tip of the multi-core fiber is the least in the reference circle and a is the radius of the reference circle.

A second invention is a connector connection structure including a pair of connector structures each of which comprises a multi-core fiber, which comprises a plurality of cores and a cladding that surrounds the cores, and a ferrule that holds the multi-core fiber. A tip of the multi-core fiber of a first of the connector structures does not protrude from an end face of the ferrule but is on an approximately the same plane and a tip of the multi-core fiber of a second of the connector structures protrudes from the end face of the ferrule. In the pair of the connector structures, tips of each of the multi-core fibers are pressed so that the multi-core fibers are optically connected facing each other. The end face of the multi-core fiber of the first connector structure is approximately flat and a relation $\Delta_2 \leq 29.6/a$ is satisfied, wherein $\Delta_2$ (µm) is a difference between a maximum protrusion height and a minimum protrusion height from an end face of the ferrule in a reference circle at the tip of the multi-core fiber of the second connector structure. The reference circle is a minimum circle that includes all mode field diameters of the plurality of the cores having the center of cross section of the multi-core fiber as its center. a (µm) is a radius of the reference circle.

A third invention is a connector connection structure including a pair of connector structures each of which comprises a multi-core fiber, which comprises a plurality of cores and a cladding that surrounds the cores, and a ferrule that holds the multi-core fiber. A tip of the multi-core fiber of each of the pair of the connector structures protrudes from an end face of the ferrule. In the pair of the connector structures, tips of each of the multi-core fibers are pressed so that the multi-core fibers are optically connected facing each other and a relation $\Delta_1 + \Delta_2$ (µm) $\leq 29.6/a$ is satisfied, wherein $\Delta_1$ and $\Delta_2$ are differences between a maximum protrusion height and a minimum protrusion height from an end face of the ferrule in a reference circle at the tip of the multi-core fiber of each of the pair of the connector structures. The reference circle is a minimum circle that includes all mode field diameters of the plurality of the cores having the center of cross section of the multi-core fiber as its center and a (µm) is a radius of the reference circle of the multi-core fiber of the pair of the connector structures.

Effects of the Invention

The present invention can provide a connector structure and the like in which physical contact with a connection target with certainty is possible.

BRIEF DESCRIPTION OF DRAWINGS

FIG. 3 (b) is a front view of a multi-core fiber 13.

FIG. 5 (b) shows the state in which the tips of the multi-core fibers 13 are pressed and brought into physical contact.

FIG. 7 (b) is a front view showing the multi-core fiber 13 with the flat-portion 17 further formed after polishing for protrusion.

FIG. 11 (b) shows the shape change of the tip part of the multi-core fiber 13 at the time of polishing for protrusion.

FIG. 11 (c) shows the shape change of the tip part of the multi-core fiber 13 at the time of polishing for protrusion.

FIG. 13 (b) shows the assembly process of the multi-core optical connector 1.

FIG. 14 is a side view showing the tips of the multi-core fibers 13 protruding from a ferrule 3a.

FIG. 17 (a) is a front view of a multi-core fiber 13a.

FIG. 17 (b) is a front view of a multi-core fiber 13b.

DESCRIPTION OF SOME EMBODIMENTS

Figure 1:
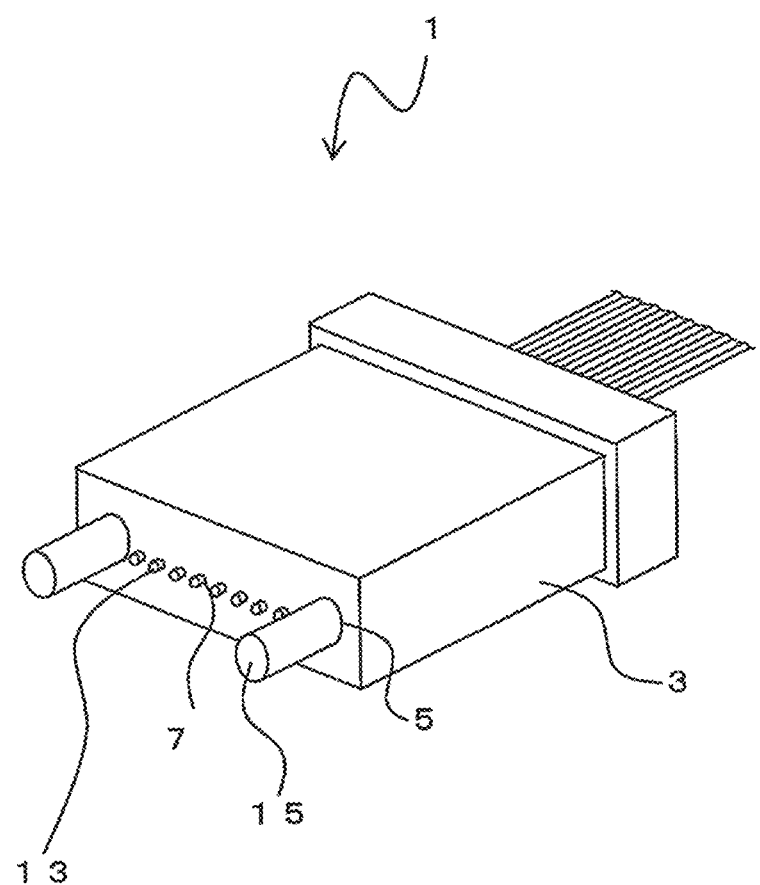
FIG. 1 is a perspective view showing a multi-core optical connector 1.
Figure 2:
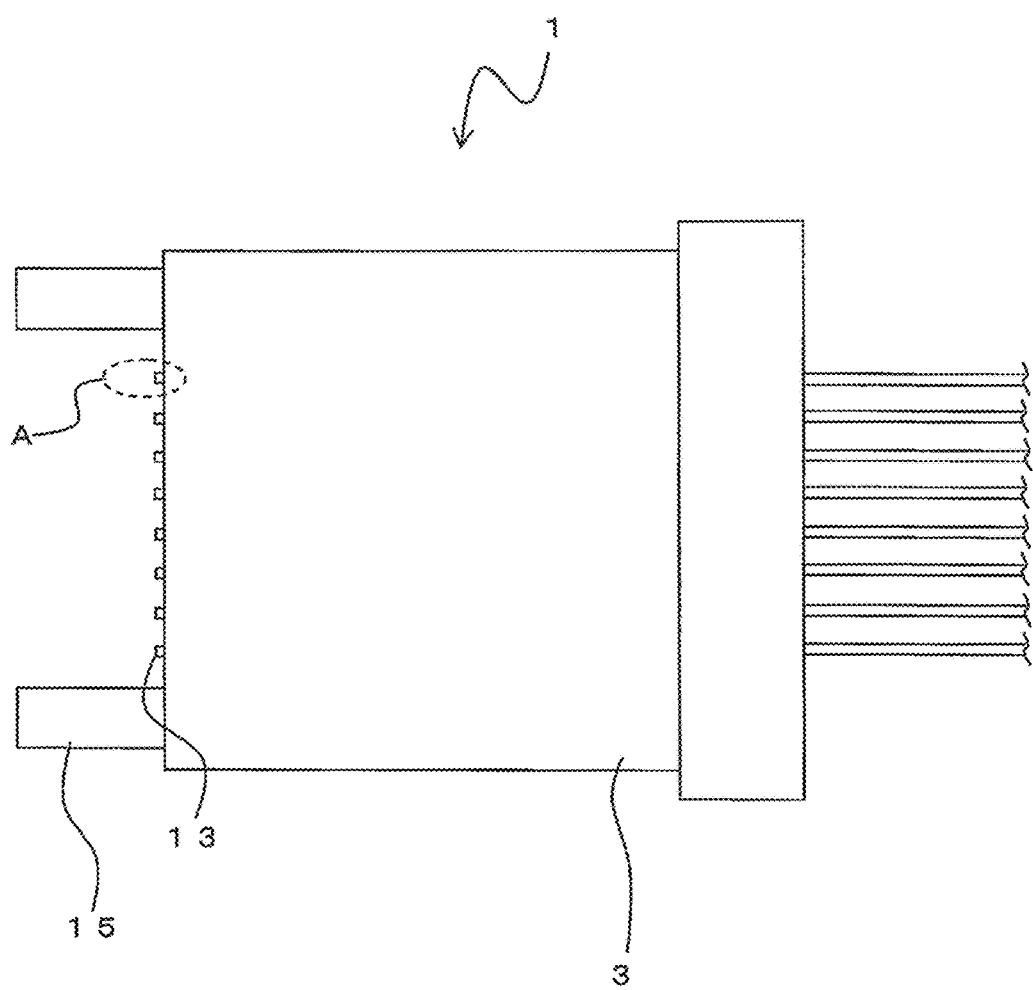
FIG. 2 is a plan view of the multi-core optical connector 1.

Hereinafter, a connector structure according to an embodiment of the present invention will be described. FIG. 1 is a perspective view and FIG. 2 is a plan view of a multi-core optical connector 1. Also, FIG. 3 (a) is an enlarged view of section A in FIG. 2 and FIG. 3 (b) is a front view of a multi-core fiber 13. The multi-core optical connector 1 mainly includes a ferrule 3, the multi-core fibers 13, and the like.

A plurality of bores 7 are formed on the ferrule 3. The bore 7 is a part through which a tip of the multi-core fiber 13 is inserted. Also, on an end face of the ferrule 3, guide holes 5, which provide a guiding mechanism, are formed on both side parts of the plurality of the bores 7. Guide pins 15 are inserted into the guide holes 5. The guide pins 15 determine the positioning of a connection target such as a connector.

By providing the guide pins 15 or guide holes 5 on both sides of the multi-core fibers 13 as above, the connector structure can be used as an MT connector (Mechanically Transferable Splicing Connector) having a guiding mechanism. Thus, it is possible to be handled similarly as the conventional connectors.

In the descriptions below, although an example applied to MT-type multi-core optical connector comprising a plurality of multi-core fibers 13 will be shown as a connector structure of the present invention, the present invention is not limited thereto. Other structures may be used as long as positioning with respect to the connection target is possible. A single-core optical connector having one multi-core fiber 13 may also be used.

Figure 3A:
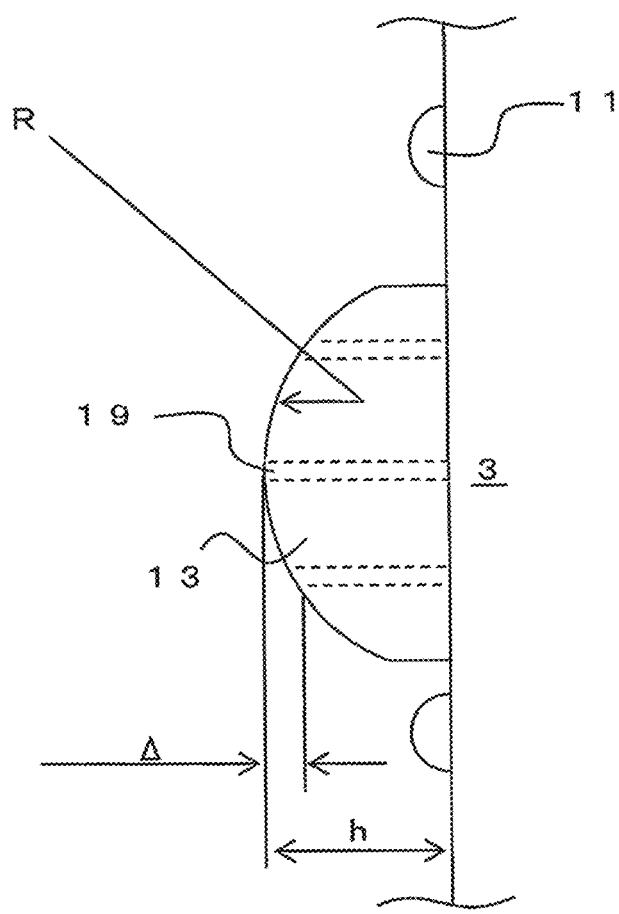
FIG. 3 (a) is an enlarged view of section A in FIG. 2.
Figure 3B:
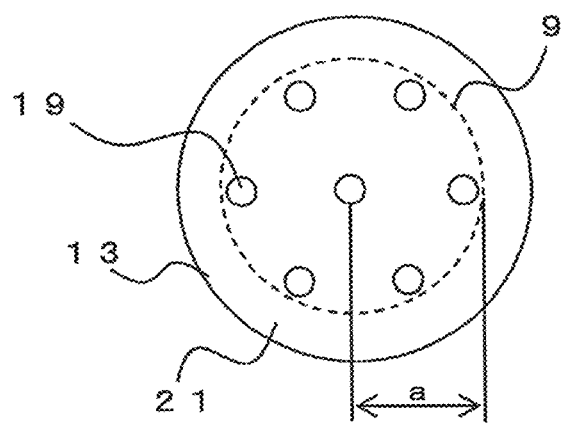

As shown in FIG. 3 (b), the multi-core fiber 13 has an approximately circular cross section with a plurality of cores 19 arranged at predetermined intervals and is an optical fiber of which the circumference is surrounded by a cladding 21 having the refractive index lower than that of the plurality of cores. For example, the total of seven cores 19 are arranged at the center of the multi-core fiber 13 and at each of the vertex positions of a regular hexagon surrounding the center. That is, the center core 19 and the surrounding six cores 19 are all at fixed intervals. Also, as for the six cores 19, the cores 19 that are adjacent to each other have the same intervals. The cores 19 serve as waveguide for signal light. The arrangement of the cores 19 is not limited to the example shown in the drawing.

The tips of a plurality of the multi-core fibers 13 protrude from the end face of the ferrule 3 by a predetermined length.

As a method for making the tips of the multi-core fibers 13 protrude from the end face of the ferrule 3 as above, there is a method in which the end face of the ferrule 3 is buffed after the multi-core fibers 13 are fixed to the ferrule 3 (hereinafter called as 'polishing for protrusion'). Buffing polish is a polishing using a polishing cloth made of fabric or paper infiltrated with paste abrasive or suspension. The ferrule 3, which is made of polishing resin, is polished preferentially so that only the multi-core fiber 13, which is made of glass (silica glass for example), can be protruded from the end face of the ferrule 3. Alumina may be used as the abrasive for example.

As shown in FIG. 3 (a), it is necessary for the protrusion height of the multi-core fiber 13 (h in the drawing) obtained from polishing for protrusion to be relatively large. This is to reduce the influences of the filler 11 and the like included in the ferrule 3 on the optical connection portion. Thus, in order to be less affected by the filler 11, the protrusion height h of the multi-core fiber 13 is preferably 5 μm or more. Securing the sufficient protrusion height h of the multi-core fiber 13 as above can secure physical contact between the multi-core fibers 13 without being impeded by inclusions.

On the other hand, the protrusion height h of the multi-core fiber 13 that is too large is not preferable in a point of view of endurance property of the multi-core fiber 13 at the time of repeated attachment and detachment of the connectors. Therefore, it is preferable that the protrusion height h of the multi-core fiber 13 is 20 μm or less.

Here, if the amount of polishing for protrusion of the ferrule 3 is increased, the polish sagging of an edge part of the tip part of the multi-core fiber 13 (approximately spherical shape) increases. That is, R (radius of curvature) of the tip face of the multi-core fiber 13 decreases.

Here, as shown in FIG. 3 (b), a reference circle 9 is a minimum circle that includes mode field diameters of all the cores 19 with the center of the multi-core fiber 13 as the center in the front view of the multi-core fiber 13. That is, at least all the cores 19 are included inside the reference circle 9. Also, if the radius of the reference circle 9 is a, $\Delta$ is the difference between the protrusion margin at the part where the protrusion margin is the greatest and the protrusion margin at the part where the protrusion margin is the smallest inside the reference circle 9 (hereinafter, 'protrusion margin difference' in short).

Figure 4:
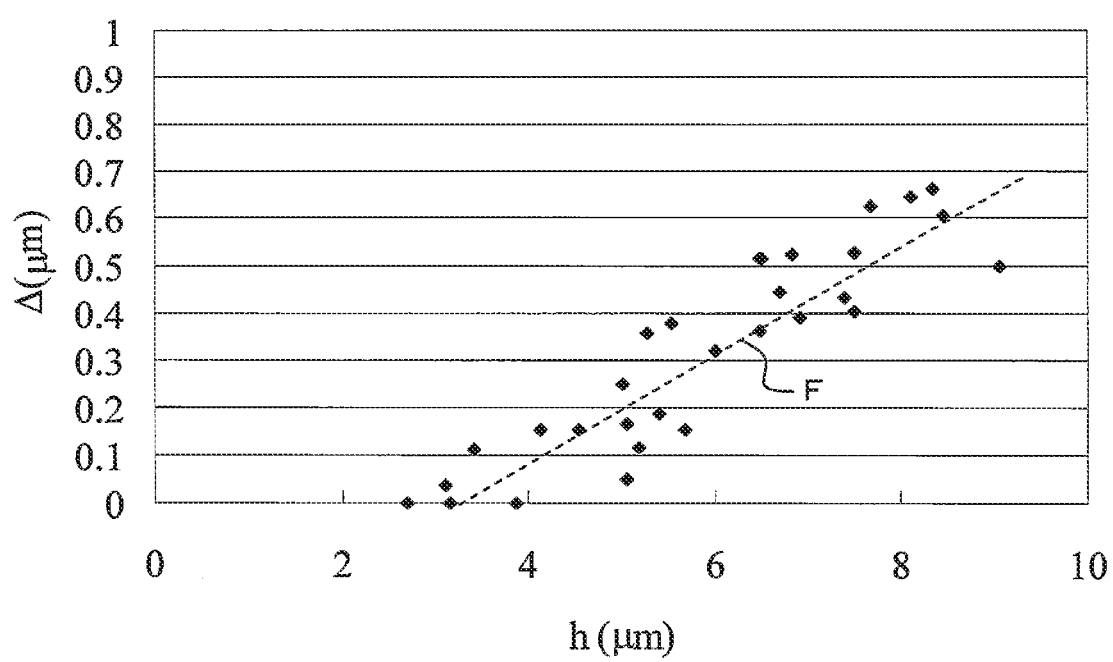
FIG. 4 is a graph showing the relation between the protrusion height h and Δ at the time of polishing for protrusion.

FIG. 4 is a graph showing the correlation between the protrusion height h (μm) at the time of polishing for protrusion and the protrusion margin difference $\Delta$ (μm) mentioned above. The outer diameter of the multi-core fiber 13 (the cladding 21) used was 181.5 μm and the core pitch thereof was 44.5 μm. Also, the mode field diameter for 1550 nm was 10.2 μm and the radius of the reference circle 9 was approximately 50 μm.

As shown in FIG. 4, if the amount of polishing for protrusion is increased so to increase the protrusion height h, the protrusion margin difference $\Delta$ is increased linearly (the straight line F in the drawing). That is, if it is attempted to secure the protrusion height h more than a predetermined amount, the protrusion margin difference $\Delta$ of the tip part of the multi-core fiber 13 increases accordingly.

Figure 5A:
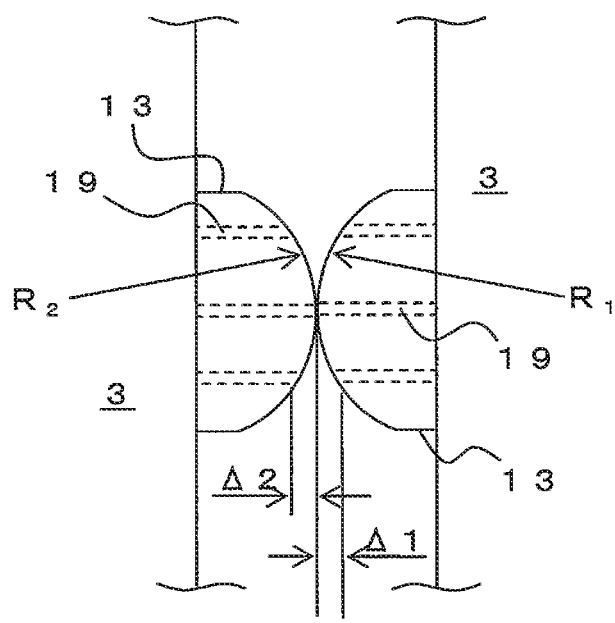
FIG. 5 (a) shows the state in which the multi-core fibers 13 are faced and butted to each other.
Figure 5B:
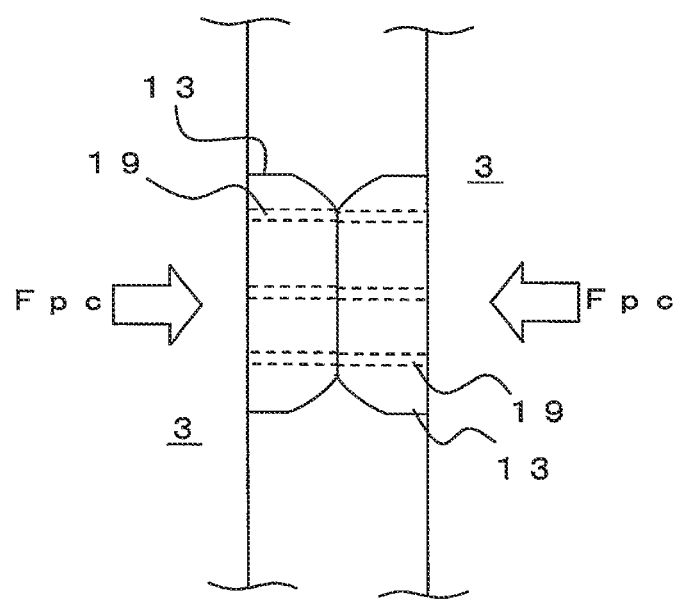

FIG. 5 (a) shows the state in which the multi-core fibers 13 are faced and butted to each other. $R_1$ and $R_2$ are the radii of curvature of the tip faces of each of the pair of the multi-core fibers 13 respectively. Also, $\Delta_1$ and $\Delta_2$ (μm) are the protrusion margin differences of the tips of the pair of the multi-core fibers 13 respectively. Also, a (μm) is the radius of each of the reference circles 9 (not shown in the drawing).

Pressing force Fpc (N) required to press the tips of the multi-core fibers 13 and bring all the cores 19 to physical contact from this state as shown in FIG. 5 (b) is expressed in the equation (1) according to the Hertz equation.

$$Fpc=(4a^3E)/(3(1-v^2))\cdot(R_1+R_2)/(2R_1R_2) \quad (1)$$

(E: Young's modulus of the multi-core fiber 13, v: Poisson ratio of the multi-core fiber 13)

The tips of the multi-core fibers 13 are pressed by an elastic member such as a connector spring (omitted in the drawing) included in the connector structure.

Since R>>a>>$\Delta$ is established at the tip of the multi-core fiber 13, it can be expressed as R≈$a^2/2\Delta$, and if this is substituted into the equation (1), the equation (2) can be obtained.

$$Fpc=(4aE)/(3(1-v^2))\cdot(\Delta_1+\Delta_2) \quad (2)$$

From the equation (2), it can be said that Fpc is linear to $(\Delta_1+\Delta_2)$.

Figure 6:
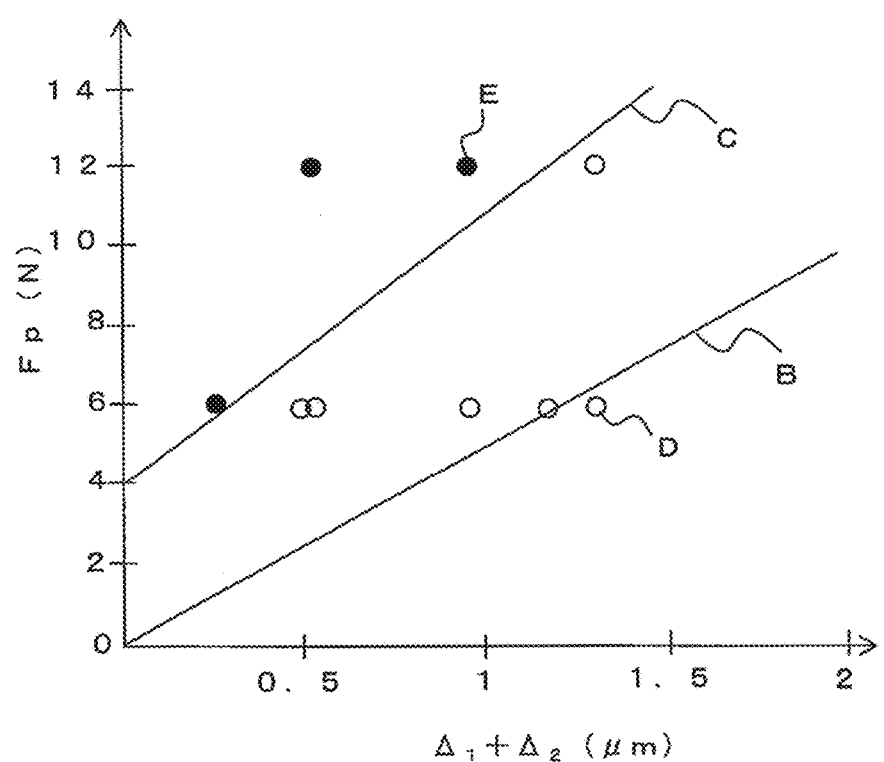
FIG. 6 is a graph showing the relation between $\Delta_1 + \Delta_2$ and Fp.

Meanwhile, the pressing force of the connector spring was varied and its correlation with $(\Delta_1+\Delta_2)$ was evaluated as shown in FIG. 6. The white circles in the graph (D in the graph) are the ones that did not come to physical contact and the black circles (E in the graph) are the ones that came to physical contact. The multi-core fiber used was similar to the one shown in FIG. 4. Also, for simplification, the example shown in FIG. 6 evaluated whether physical contact between single-core multi-core fibers 13 is possible or not.

The straight line B in the graph is a theoretical straight line calculated from the equation (2) with Young's modulus E=71.5 GPa and Poisson ratio v=0.14. That is, theoretically, physical contact is expected to occur above the straight line B (on the side in which the pressing force of the connector spring is stronger). However, when the inventors actually evaluated, it turned out that the boundary of whether physical contact is possible or not was the straight line C.

The reasons for the straight line C, which is the actual boundary of whether physical contact is possible or not, to be shifted from the theoretical straight line B can be considered as below. First of all, the pressing force Fp of the connector spring is not zero when $(\Delta_1+\Delta_2)$=0. This may be because not the entire pressing force Fp of the connector spring is used as the pressing force on the tips of the multi-core fibers 13 since there may be resistance between the guide pins of the connectors when inserted to each other and the like. That is, it can be said that the pressing force Fp of the connector spring=the pressing force Fpc applied to the multi-core fiber+the resistance force Fr of the connector.

The resistance force Fr of the connector used this time was approximately 4N. The resistance force Fr of the connector is dependent on the connector used. Therefore, when setting the pressing force of the connector spring, Fr should be evaluated in advance and Fp may be set by adding Fr to the required pressing force for physical contact of the multi-core fibers 13.

Next, a difference between the inclinations of the straight line B and the straight line C will be considered. The inclination of the straight line C, which is the actual boundary of whether physical contact is possible or not, is larger than that of the theoretical straight line B. This may be because, for example, the tip shape of the multi-core fiber 13 is not in an ideal shape as shown in FIG. 3 (a) so that the positions of the center and the maximum point of the protrusion margin may be shifted, $\Delta$ may not be uniform in the circumferential direction of the reference circle, or the like. Therefore, it can be considered that as $\Delta_1+\Delta_2$ increases, the amount of deviation from the theoretical value increases, and as a result, the required pressing force Fpc is increased.

Accordingly, the inventors calculated the correction coefficient $\alpha$ for the inclination of the theoretical straight line B to be the inclination of the actual straight line C, and it was found that $\alpha$=1.39.

Therefore, if the number of the multi-core fibers is n, the condition for physical contact to occur can be expressed in the equation (3).

$$Fp \geq (4aE\alpha n)/(3(1-v^2))\cdot(\Delta_1+\Delta_2)+Fr \quad (3)$$

Here, Fp=Fr+Fpc. Therefore, the condition for physical contact to occur can be expressed in the equation (4).

$$Fpc \geq (4aE\alpha n)/(3(1-v^2))\cdot(\Delta_1+\Delta_2) \quad (4)$$

Although it is possible to bring the cores into physical contact if the pressing force Fpc applied to the tips of the multi-core fibers 13 is increased, there is a limit to the pressing force Fpc that can be given to the tip of the multi-core fiber 13. In practice, the pressing force Fpc that can be given is approximately 4N per multi-core fiber 13. If the pressing force per multi-core fiber 13 exceeds 4N, the tip may be damaged. That is, it is expressed as Fpc (N)=4n.

Therefore, the equation (3) can be expressed as the equation (5) when Young's modulus E=71.5 GPa and Poisson ratio v=0.14, $\alpha$=1.39 of the multi-core fiber 13 are substituted.

$$(\Delta_1+\Delta_2) \text{ (μm)} \leq 29.6/a \quad (5)$$

Also, if $\Delta_1$ and $\Delta_2$ are the same $\Delta$, all the cores can be brought into physical contact when the condition of the equation (6) is satisfied.

$$\Delta \text{ (μm)} \leq 14.8/a \quad (6)$$

Here, for example, if a=50 μm, all the cores can be brought into physical contact when the condition of Δ (∥m)≤0.296 μm≈0.3 μm is satisfied.

Here, as mentioned above, Δ tends to increase if the protrusion height h of the multi-core fiber 13 is increased. Therefore, if the protrusion height h of the multi-core fiber 13 is increased not to be affected by the filler 11, Δ increases and the equation (6) may not be satisfied.

So, in the present invention, after fixing the multi-core fibers 13 to the ferrule 3 and protruding the tips of the multi-core fibers 13 by polishing for protrusion, it is also possible to further form flat-portions on the tips of the multi-core fibers 13.

Figure 7A:
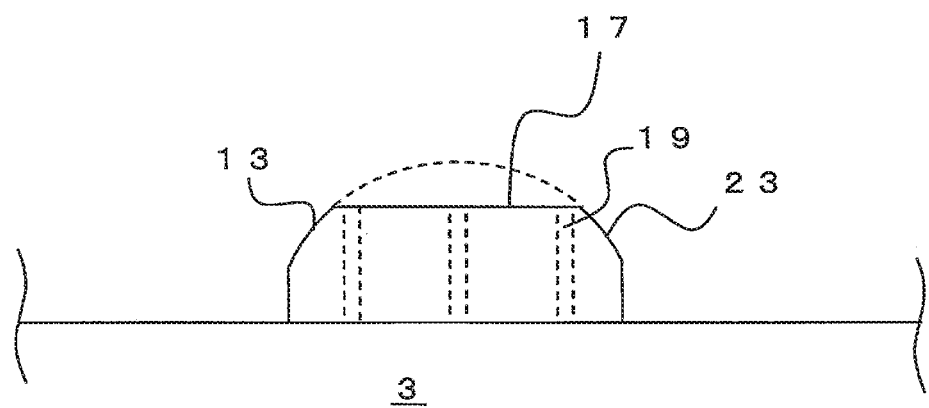
FIG. 7 (a) is a side view showing the multi-core fiber 13 with a flat-portion 17 further formed after polishing for protrusion.
Figure 7B:
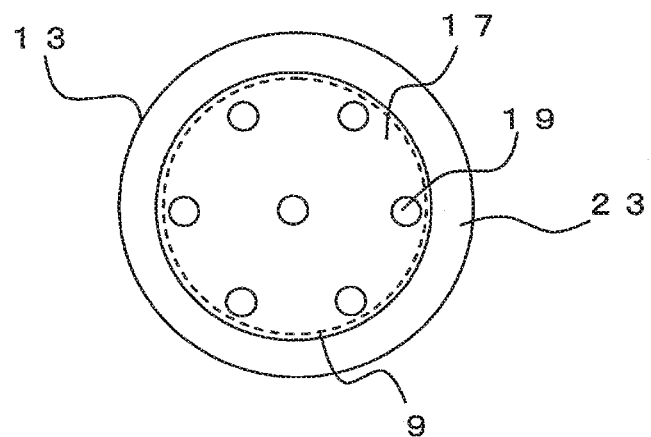

FIG. 7 (*a*) is a side view and FIG. 7 (*b*) is a front view showing the multi-core fiber 13 having a flat-portion 17 further formed thereon after polishing for protrusion. As described above, since polishing for protrusion selectively polishes the end face of the ferrule 3 and protrudes the tips of the multi-core fibers 13, buffing using a buff or the like is adopted. On the other hand, the flat-portion 17 can be formed by polishing using an abrasive sheet or the like (hereinafter, flat polishing in short).

For flat polishing, for example, an abrasive sheet or the like may be disposed on a surface plate and the tips of the multi-core fibers 13 may be polished vertically to the longitudinal direction of the multi-core fibers 13. That is, polishing is done without using a buff or the like.

It is preferable that the range of the flat-portion 17 formed is larger than the reference circle 9. In this way, the mode field diameter of all the cores 19 is included within the flat-portion 17. Forming the flat-portion 17 like this can make the protrusion margin difference Δ extremely small.

Figure 8:
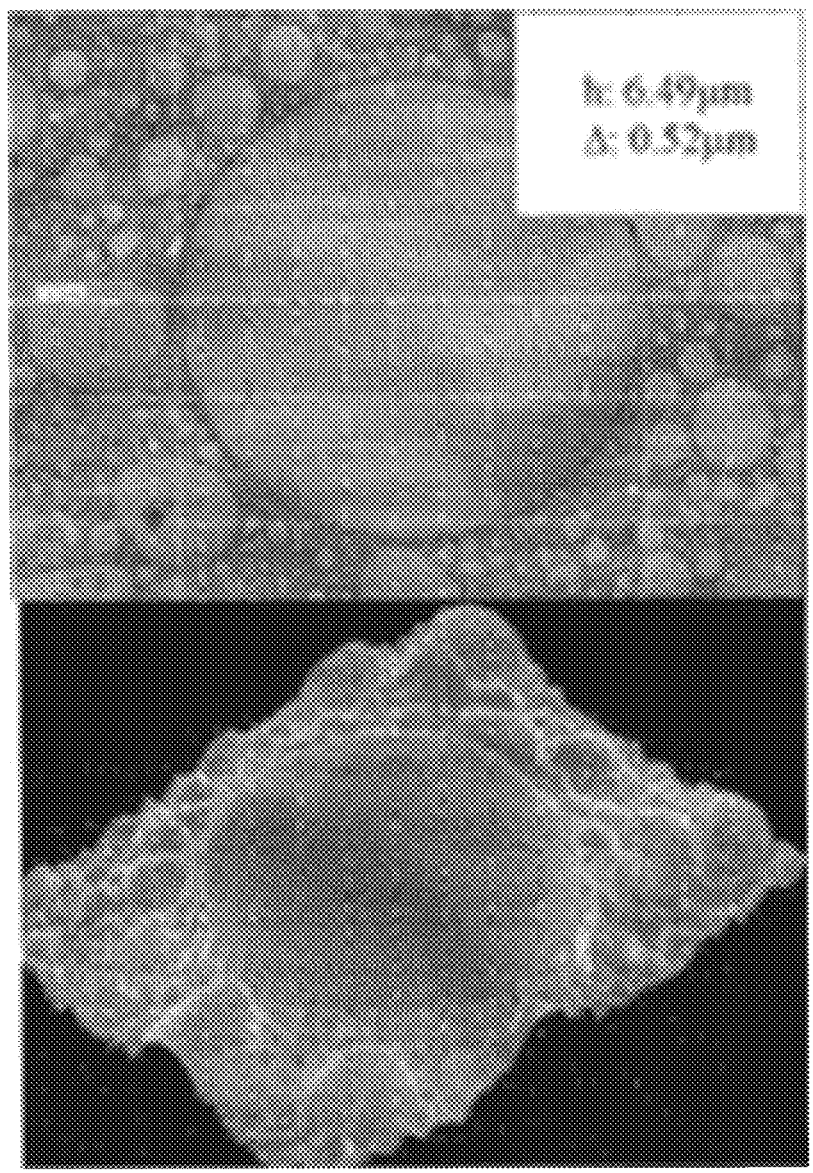
FIG. 8 is a laser microscopic picture and a 3D perspective view showing the tip part of the multi-core fiber 13 without the flat-portion 17.
Figure 9:
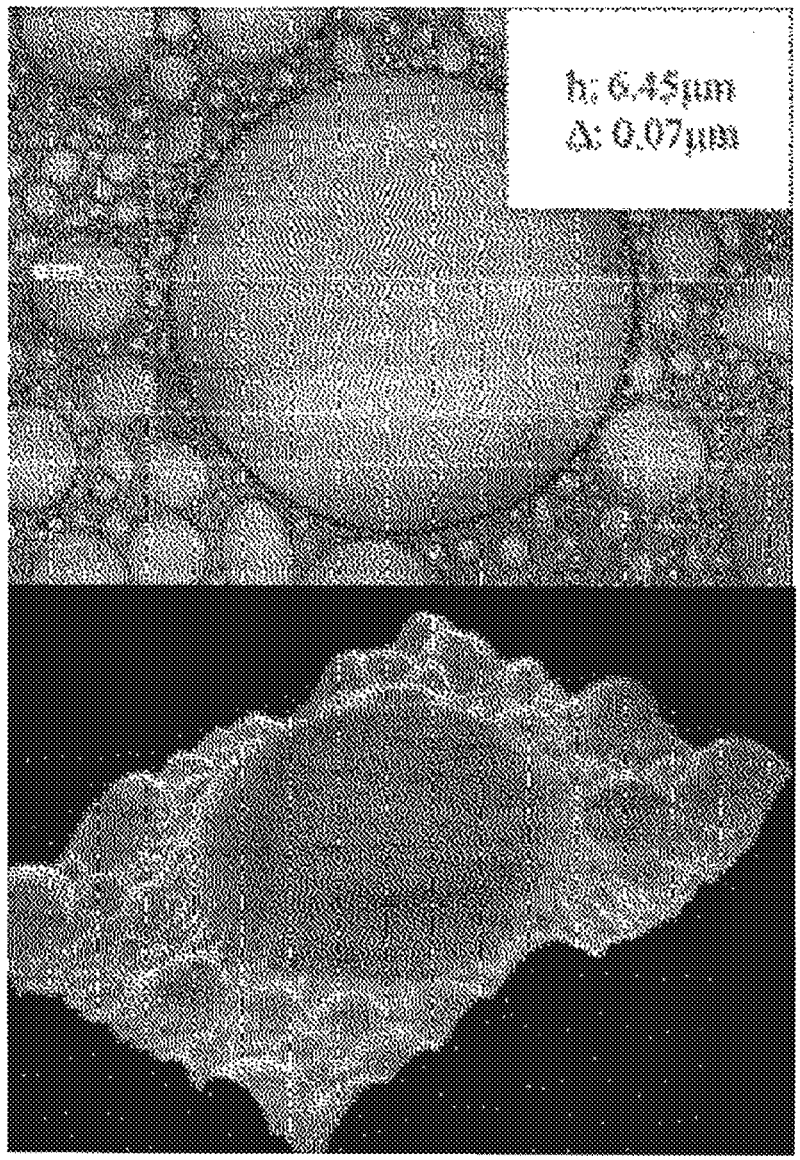
FIG. 9 is a laser microscopic picture and a 3D perspective view showing the tip part of the multi-core fiber 13 with the flat-portion 17 formed.

The upper row of FIG. 8 is a laser microscopic picture showing the tip part of the multi-core fiber 13 without the flat-portion 17 formed, and the lower row is a 3D perspective view of the same. Also, the upper row of FIG. 9 is a laser microscopic picture showing the tip part of the multi-core fiber 13 with the flat-portion 17 formed, and the lower row is a 3D perspective view of the same. In the laser microscopic pictures, the large circles in the middle are the multi-core fibers 13 and the surrounding smaller circles are the fillers 11 that are exposed to the end face of the ferrule.

As shown in FIG. 8, when the protrusion height h and the protrusion margin difference Δ of the multi-core fiber 13 without the flat portion 17 formed were measured after only polishing for protrusion, it was found that the protrusion height h=6.49 μm, and the protrusion margin difference Δ=0.52 μm.

On the other hand, as shown in FIG. 9, when the protrusion height h and the protrusion margin difference Δ of the multi-core fiber 13 with the flat portion 17 formed were measured after polishing for protrusion and flat polishing, it was found that the protrusion height h=6.45 μm, and the protrusion margin difference Δ=0.07 μm. Thus, it was found that, forming the flat-portion 17 could make the protrusion margin difference Δ extremely small even if an approximately the same protrusion height was secured.

Figure 10:
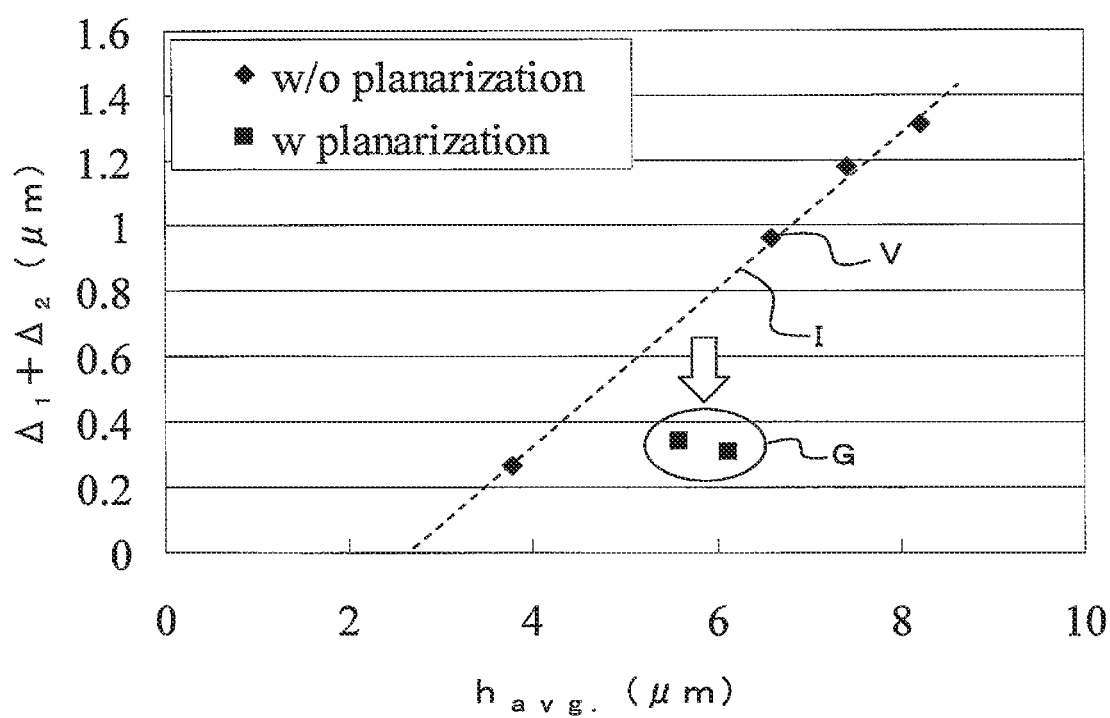
FIG. 10 is a graph showing the relation between the protrusion height $h_{avg.}$ and $\Delta_1 + \Delta_2$ with or without the flat-portion.

FIG. 10 is a graph showing a relation between the protrusion height $h_{avg.}$ and $\Delta_1+\Delta_2$ with or without the flat-portion 17. The horizontal axis of the graph shows the average of $h_1$ and $h_2$, which are the protrusion heights of each of the multi-core fibers 13, (i.e. $h_{avg.}=(h_1+h_2)/2$), and the vertical axis shows the sum of $(\Delta_1+\Delta_2)$. Also, the rhombuses in the graph (V in the graph) are for cases in which the flat-portions are not formed and the squares in the graph (G in the graph) are for cases in which the flat-portions are formed.

As mentioned above, with only ordinary polishing for protrusion, there is a correlation between the protrusion height $h_{avg}$ and the protrusion margin difference $(\Delta_1+\Delta_2)$ (the straight line I in the graph). That is, if the protrusion height $h_{avg}$ is increased, the protrusion margin difference $(\Delta_1+\Delta_2)$ increases linearly. On the other hand, with the planarization process, the distribution can be lower than the straight line I (in the direction in which $\Delta_1+\Delta_2$ is smaller) (G in the drawing). That is, it is possible to suppress the protrusion margin difference $\Delta_1+\Delta_2$ to be small even if the protrusion height $h_{avg}$ is increased.

Thus, forming the flat-portion 17 can reduce the protrusion margin difference Δ even if the protrusion height h is increased. Therefore, all the cores 19 can be brought into physical contact with more certainty.

Also, as shown in FIG. 7 (*a*), a chamfer-portion 23 is formed around the flat-portion 17 at the time of polishing for protrusion. By chamfering the tip edge part of the multi-core fiber 13 like this, the multi-core fiber 13 has its end face shape that is preferable for physical contact. Although it is preferable that the protrusion margin difference Δ is zero, it is difficult to make Δ completely zero in manufacturing, therefore, Δ is to be 0.01 μm or more.

Also, furthermore, after flat polishing, the boundary between the flat-portion 17 and the chamfer-portion 23 may be smoothed by buffing and the like to make a continuous surface.

Figure 11A:
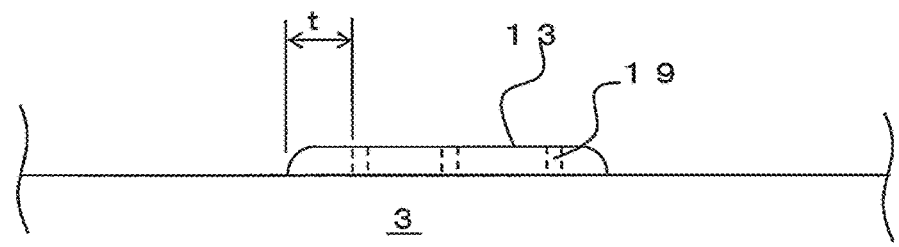
FIG. 11 (a) shows the shape change of the tip part of the multi-core fiber 13 at the time of polishing for protrusion.
Figure 11B:
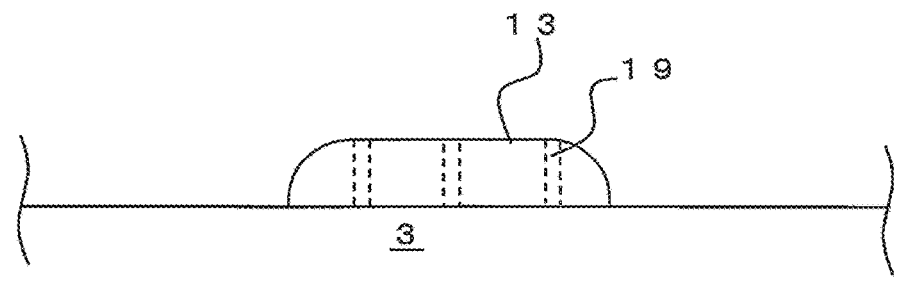
Figure 11C:
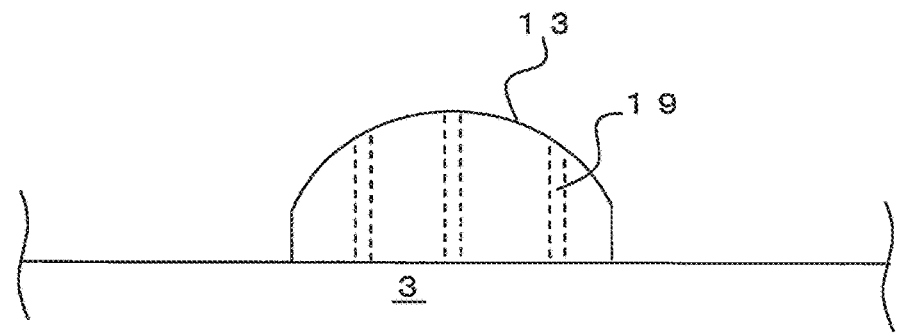

Next, change in shape of the tip of the multi-core fiber 13 at the time of polishing for protrusion will be observed in detail. First, at an early stage of polishing for protrusion, the tip of the multi-core fiber 13 protrudes slightly from the end face of the ferrule 3 as shown in FIG. 11 (*a*). At this time, a part of the tip edge part of the multi-core fiber 13 is chamfer polished.

Furthermore, when polishing for protrusion is continued, the protrusion height of the multi-core fiber 13 increases as shown in FIG. 11 (*b*). If the protrusion height of the multi-core fiber 13 is short, its shape is similar to that with a flat-portion 17 formed at the tip part of the multi-core fiber 13.

On the other hand, if a protrusion height more than the predetermined value is to be secured, the surface sagging of the tip edge part of the multi-core fiber 13 becomes larger as shown in FIG. 11 (*c*) and the surface sagging part extends over to the part of the core 19. As a result, a protrusion margin difference between the cores 19 is to be generated.

Here, the thickness of the cladding 21, which is from the core 19 positioned at the outermost periphery of the reference circle 9 to the peripheral surface of the multi-core fiber 13, is t. In this case, if the peripheral cladding thickness t is increased, the surface sagging of the tip edge part of the multi-core fiber 13 can be reduced and so that the protrusion margin difference between the cores 19 can be reduced.

However, if the peripheral cladding thickness t is increased, the outer diameter of the multi-core fiber 13 increases, which is not preferable. Also, although there is another way of increasing the peripheral cladding thickness t by bringing the cores 19 closer while maintaining the fixed outer diameter of the multi-core fiber 13, there is a limit thereto due to problems such as cross talk. Therefore, it is preferable that the peripheral cladding thickness t is 50 μm or less with the desired pitch of the core 19 maintained. On the other hand, since desired optical characteristics may not be fulfilled if the peripheral cladding thickness t is too thin, the peripheral cladding thickness t is preferably 30 μm or more.

Figure 12:
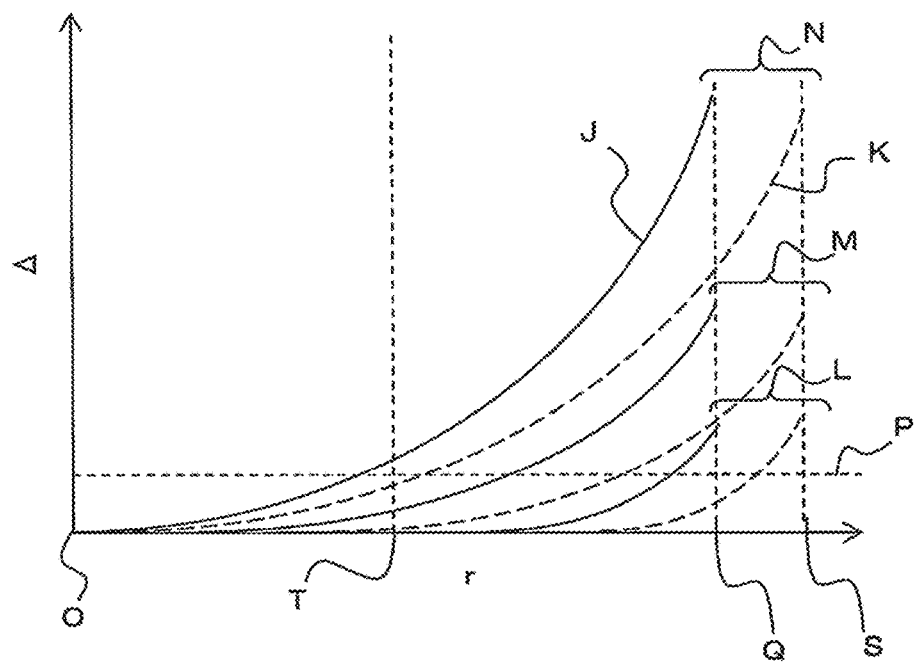
FIG. 12 is a graph showing the shape of the multi-core fiber 13 and is a graph showing the relation between the distance r from the center and Δ.

FIG. 12 shows the results of evaluation of the tip shape difference of the multi-core fiber 13 with the different peripheral cladding thickness t. The vertical axis shows the protrusion margin difference Δ of each part from the center and the horizontal axis shows the distance from the center of the multi-core fiber 13. O in the graph is at the center of the multi-core fiber and T is at the position where r=a (that is, on the circumference of the reference circle 9). Also, P in the graph shows the protrusion margin difference Δ required for physical contact. For the example shown in the graph, a=50 μm and, therefore, P in the graph shows Δ=0.3 μm.

Also, the solid lines J in the graph are for the case in which the peripheral cladding thickness t=41 μm and the dotted lines K in the graph are for the case in which the peripheral cladding thickness t=52 μm. That is, the maximum values of r for both the curved lines J and K indicate the positions of the cladding end part. Specifically, the maximum value for the solid line J with the peripheral cladding thickness t=41 μm in the horizontal axis (Q in the graph) is r=50 μm+41 μm, and the maximum value for the dotted line K with the peripheral cladding thickness t=52 μm in the horizontal axis (S in the graph) is r=50 μm+52 μm.

Also, the group L in the graph is for the case in which the protrusion height h=2 μm, the group M in the graph is for the case in which the protrusion height h=4 μm, and the group N is for the case in which the protrusion height h=6 μm. As described above, the protrusion margin difference Δ increases as the protrusion height h is increased.

As it is clear from the graph, the protrusion margin difference Δ tends to become larger when the peripheral cladding thickness t is smaller (the solid line J) compared with the case in which the peripheral cladding thickness t is large (the dotted line K). This is because, as shown in FIG. 11 (a) to FIG. 11 (c), when the peripheral cladding thickness t is large, influence of the surface sagging generated by polishing does not easily affect the reference circle so that the protrusion margin difference Δ becomes smaller.

However, as described above, in order to suppress the outer diameter of the multi-core fiber 13 being small, it is preferable that the peripheral cladding thickness t is 50 μm or less. Also, as described above, in order to eliminate the influence of the filler 11 and the like, it is preferable that the protrusion height h is 5 μm or more. That is, it is necessary for the protrusion margin difference Δ to be 0.3 μm or less even for the solid line J in the group N in the graph. However, as it is clear from the graph, the protrusion margin difference Δ is more than 0.3 μm for the solid line J in the group N in the graph. Thus, physical contact is impossible.

In such a case, forming the flat-portions 17 as shown in FIG. 7 (a) and FIG. 7 (b) can make the peripheral cladding thickness t=50 μm or less and the protrusion margin difference Δ=0.3 μm or less even if the protrusion height h is 5 μm or more.

Next, a production method for the connector structure of the present invention will be described. As mentioned above, the connector structure can be produced by applying polishing for protrusion (and flat polishing) to the end face of the ferrule 3 after inserting and fixing the multi-core fibers 13 to the ferrule 3. On the other hand, the connector structure of the present invention can also be produced as follows.

Figure 13A:
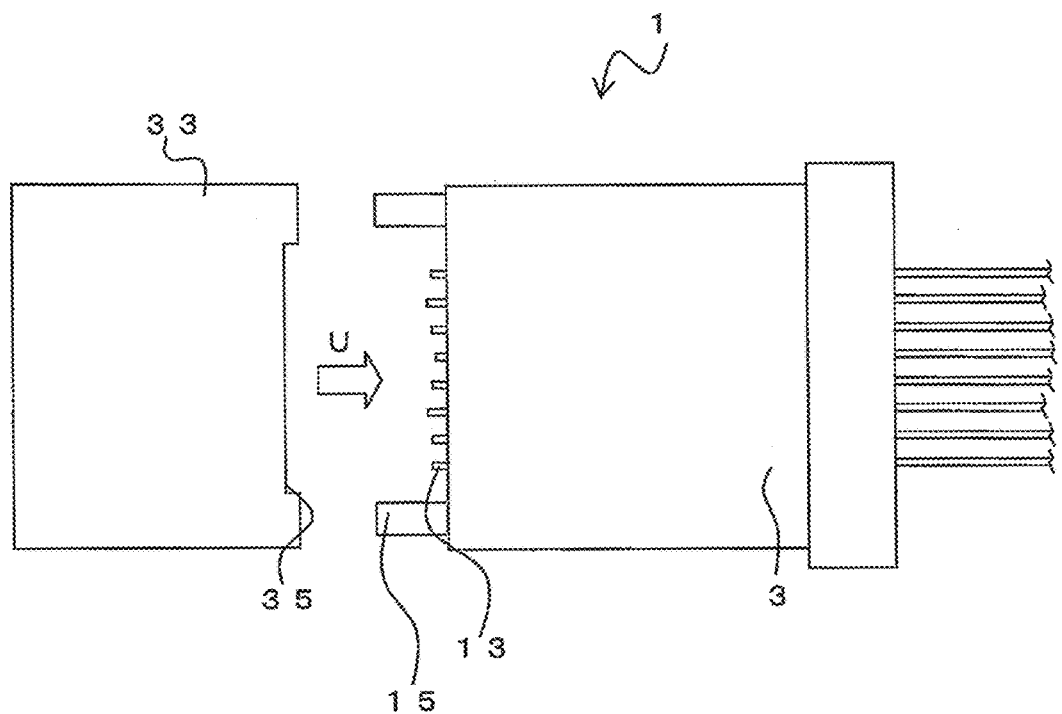
FIG. 13 (a) shows the assembly process of the multi-core optical connector 1.
Figure 13B:
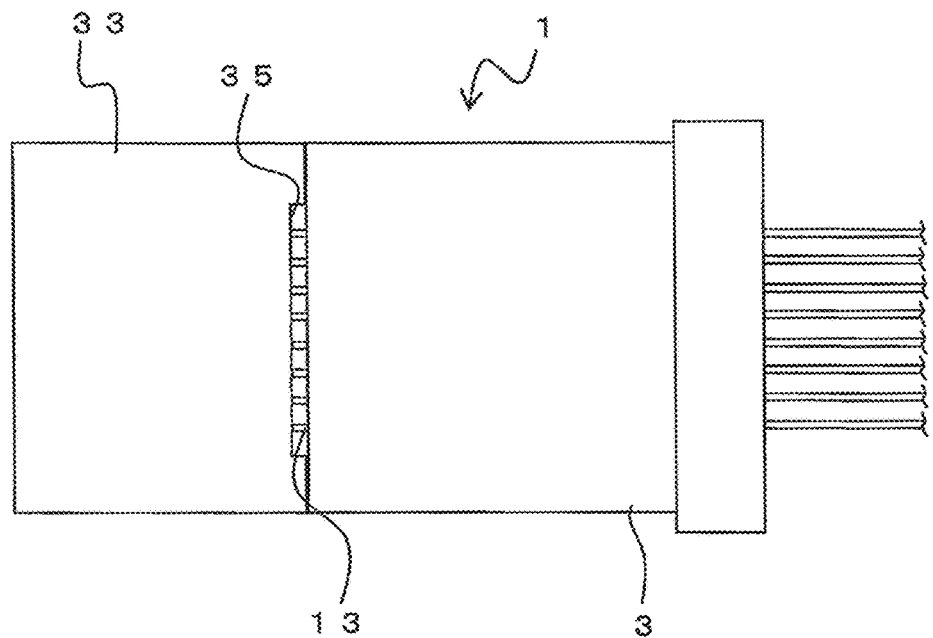

First, the multi-core fibers 13 are inserted through the ferrule 3 as shown in FIG. 13 (a). Next, a butting member 33 is arranged in a connecting direction of the ferrule 3 (in a protruding direction of the tips of the multi-core fibers 13) and butted to the ferrule 3 (arrow U in the drawing). The butting member 33 is a member having guide holes that fit the guide pins 15 and a recess portion 35 that is formed over the range in which the multi-core fibers 13 protrude, for example.

As shown in FIG. 13 (b), when the butting member 33 is butted to the ferrule 3, a clearance is formed between the end face of the ferrule 3 and the butting member 33. Here, by pushing the multi-core fibers 13 toward the tip direction of the ferrule 3, each of the tips of the multi-core fibers 13 butts against the butting member 33. Therefore, the tips of the multi-core fibers 13 can be protruded from the end face of the ferrule 3 by a predetermined amount of protrusion corresponding to the recess portion 35.

In this state, each of the multi-core fibers 13 is fixed to the ferrule 3 by adhesion. As above, the connector structure can be constructed. The multi-core fiber 13 that is inserted through the ferrule 3 can be, for example, cut with a laser cleaver so that a part of the tip of the multi-core fiber 13 (the reference circle for example) can be approximately planar. In addition, cutting with a laser cleaver can make the edge of the cladding into rounded shape by the surface tension of the silica glass.

The multi-core fiber 13 that is inserted through the ferrule 3 can also be cut with a fiber cleaver. In this case, if the cutting plane is heat-treated (such as arc discharge or burner heating), the similar tip shape can be obtained as from the cutting with the laser cleaver. The similar shape can also be obtained by chemical etching of the tip of the multi-core fiber 13 with fluoric acid and the like. Furthermore, the multi-core fiber 13 of which the tip edge part is chamfering-processed (chamfer polishing and the like) in advance may also be used.

The connector structure of the present invention can also be obtained from the method as above. Also, in such a method, since it is possible to control the protrusion height h by the depth of the recess portion 35 of the butting member 33, the connector structure with a small protrusion margin difference Δ can be obtained even if the protrusion height h is increased.

Figure 14:
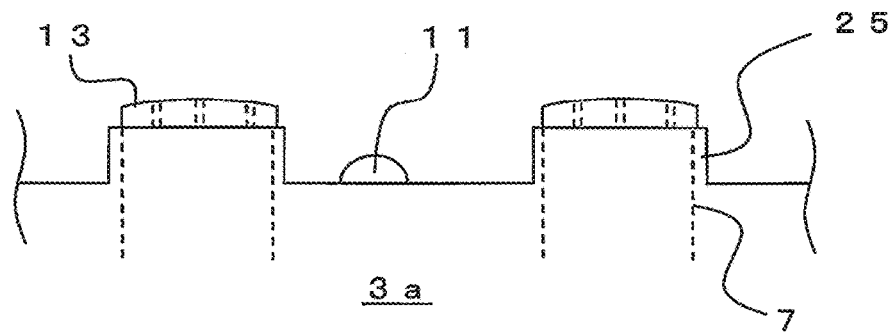

A ferrule 3a shown in FIG. 14 may also be used. On the ferrule 3a, protruding portions 25 are formed so that the parts on which the bores 7 are formed protrude toward the tip side. That is, the bore 7 is formed at the protruding portion 25 through which the multi-core fiber 13 is inserted. Polishing for protrusion slightly after inserting the multi-core fiber 13 through the ferrule 3a can suppress the protrusion margin difference Δ to be small while the protrusion height h is secured to the height of the protruding portion 25 and the influence of the filler 11 and the like can be suppressed.

As described above, according to the embodiments of the present invention, the connector structure that can secure physical contact with a connection target with certainty can be obtained by making the protrusion margin difference Δ (μm)≤14.8/a. Also, securing sufficient protrusion height h can suppress the influence of the filler 11 of the end face of the ferrule 3 and the like to the connecting part of the tip of the multi-core fiber 13.

Also, when polishing for protrusion is carried out, the protrusion margin difference Δ usually increases if the protrusion height h is increased. Therefore, physical contact with a connection target becomes difficult. However, in the present invention, flat polishing can make the protrusion margin difference Δ small when the protrusion height h is increased and the protrusion margin difference Δ increases. Also, forming the flat-portion 17 can make the protrusion margin difference Δ small even if the peripheral cladding thickness t is reduced. Furthermore, in this case, since the surface sagging part, which is generated around the flat-portion 17 at the time of polishing for protrusion, functions as a chamfer-portion, a tip shape that is appropriate for physical contact can be obtained.

Also, using the butting member 33 can make the tips of the multi-core fibers 13 protrude from the end face of the ferrule 3 by a predetermined amount easily. Thus, it is not necessary for the end face of the ferrule 3 to be polished for protrusion. Consequently, it is possible to suppress the generation of polish sagging at the edge part of the end face of the multi-core fiber 13.

Also, on this occasion, a tip shape that is appropriate for physical contact can be obtained if chamfering of the tip of the multi-core fiber 13 is carried out before inserting the multi-core fiber 13 through the ferrule 3.

Also, even if the amount of polishing for protrusion is reduced, the protrusion height h can be secured by forming the protruding portion 25 at the tip part of the ferrule 3 so that the multi-core fiber 13 protrudes from the end face of the protruding portion 25.

Figure 15:
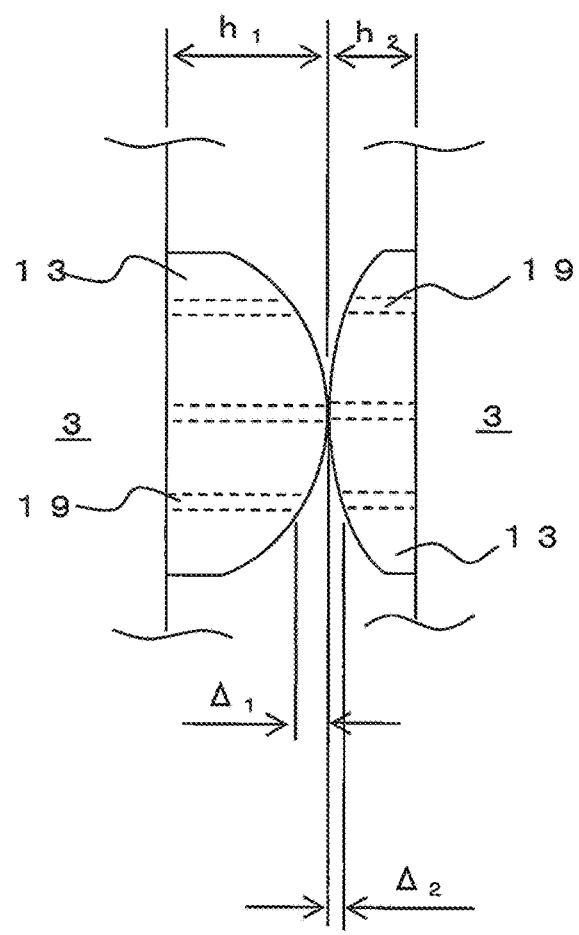
FIG. 15 shows another embodiment of the state in which the multi-core fibers 13 are faced and butted to each other.

In the connector connection structure according to the present invention, as shown in FIG. 15, the protrusion heights $h_1$ and $h_2$ and the protrusion margin differences $\Delta_1$ and $\Delta_2$ of the multi-core fibers 13 facing to each other may not be the same respectively. The above-mentioned equation (5) may be satisfied in this case.

Figure 16:
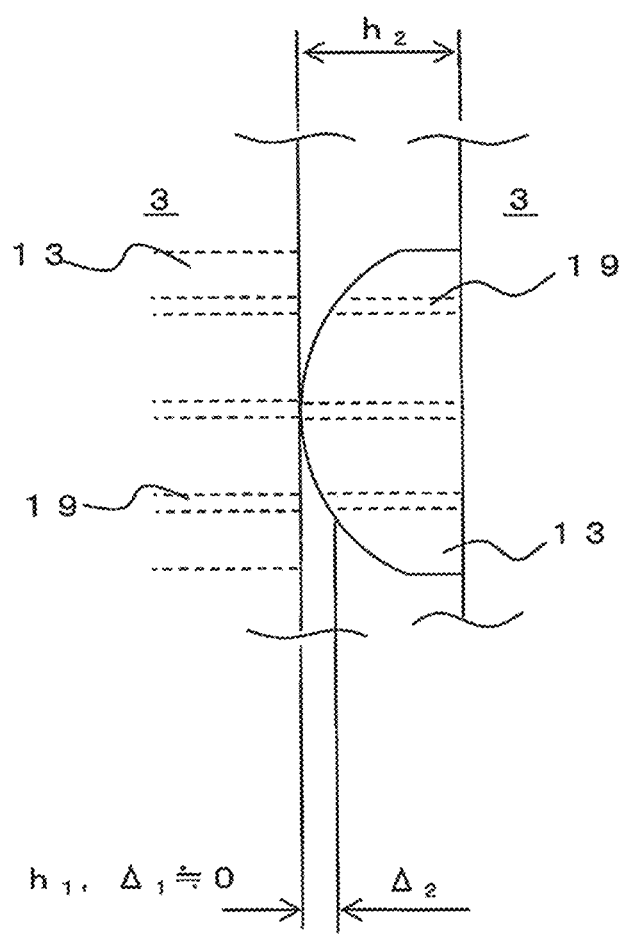
FIG. 16 shows another embodiment of the state in which the multi-core fibers 13 are faced and butted to each other.

Also, as shown in FIG. 16, this includes a case in which the protrusion height $h_1$ and the protrusion margin difference $\Delta_1$ of one of the multi-core fibers 13 facing to each other are almost zero. In such a case, the protrusion margin difference $\Delta_2$ of the other multi-core fiber 13 may satisfy that the protrusion margin difference $\Delta_2$ ($\mu$m)$\leq$29.6/a. The shape of the end face of the multi-core fiber 13 with the almost zero protrusion height $h_1$ and protrusion margin difference $\Delta_1$ can be obtained by flat polishing of the ferrule 3 using an abrasive sheet.

Figure 17A:
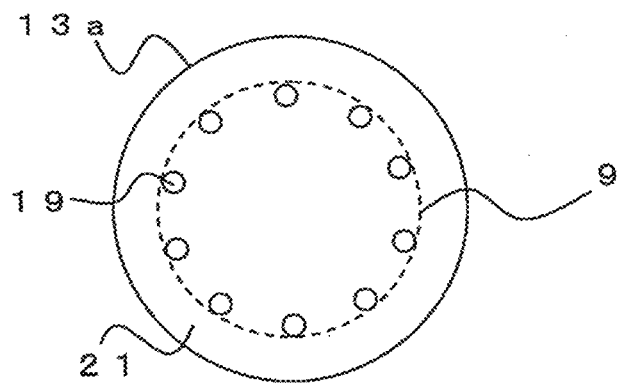
Figure 17B:
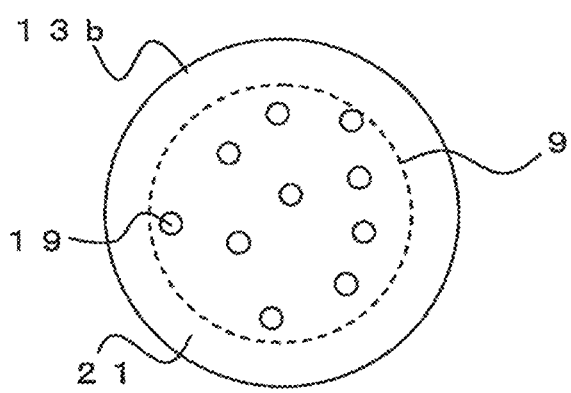

Also, as for the arrangement of the cores 19 in the multi-core fiber 13 of the present invention, it is not limited to the arrangement as shown in FIG. 3 (b), in which one of the cores 19 is arranged at the center and the rest are arranged closely on the circumference thereof. For example, the cores 19 may be arranged annularly as in the multi-core fiber 13a shown in FIG. 17 (a) or may be arranged randomly as in the multi-core fiber 13b shown in FIG. 17 (b). In such cases, the minimum circle that includes the mode field diameter of all the cores 19 in regard to the center of the multi-core fiber may still be the reference circle 9.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

What is claimed is:

1. A connector structure comprising:
    a multi-core fiber, which comprises a plurality of cores and a cladding that surrounds the cores; and
    a ferrule that holds the multi-core fiber; wherein
        a tip of the multi-core fiber protrudes from an end face of the ferrule; and
        a relation $\Delta \leq 14.8/a$ is satisfied, wherein
            $\Delta$ ($\mu$m) is a difference between a maximum protrusion height and a minimum protrusion height from an end face of the ferrule in a reference circle at the tip of the multi-core fiber;
            the reference circle is a minimum circle that includes all mode field diameters of the plurality of the cores having a center of cross section of the multi-core fiber as its center; and
            a ($\mu$m) is a radius of the reference circle, wherein
                one of the plurality of cores is located at the center of cross-section of the multi-core fiber, and
                the core that is located at the center has a protrusion height from the end face of the ferrule greater than protrusion heights of the other cores.

2. The connector structure according to claim 1, wherein the maximum protrusion height of the multi-core fiber from an end face of the ferrule is 5 $\mu$m or more.

3. The connector structure according to claim 1, wherein a thickness of the cladding that is formed on a periphery of the reference circle is 50 $\mu$m or less.

4. The connector structure according to claim 1, wherein the ferrule holds a plurality of the multi-core fibers.

5. A connector structure comprising:
    a multi-core fiber, which comprises a plurality of cores and a cladding that surrounds the cores; and
    a ferrule that holds the multi-core fiber; wherein
        a tip of the multi-core fiber protrudes from an end face of the ferrule; and
        a relation $\Delta \leq 14.8/a$ is satisfied, wherein
            $\Delta$ ($\mu$m) is a difference between a maximum protrusion height and a minimum protrusion height from an end face of the ferrule in a reference circle at the tip of the multi-core fiber;
            the reference circle is a minimum circle that includes all mode field diameters of the plurality of the cores having a center of cross section of the multi-core fiber as its center; and
            a ($\mu$m) is a radius of the reference circle, wherein
        a tip part of the multi-core fiber has an approximately flat flat-portion and a chamfer-portion formed on a circumference of the flat-portion; and
        the reference circle is included within the flat-portion.

6. The connector structure according to claim 5, wherein the maximum protrusion height of the multi-core fiber from an end face of the ferrule is 5 $\mu$m or more.

7. The connector structure according to claim 5, wherein a thickness of the cladding that is formed on a periphery of the reference circle is 50 $\mu$m or less.

8. The connector structure according to claim 5, wherein the ferrule holds a plurality of the multi-core fibers.

9. A connector connection structure including:
    a pair of connector structures each of which comprises:
        a multi-core fiber, which comprises a plurality of cores and a cladding that surrounds the cores; and
        a ferrule that holds the multi-core fiber, wherein:
            a tip of the multi-core fiber of a first of the connector structures does not protrude from an end face of the ferrule but is on an approximately same plane;
            a tip of the multi-core fiber of a second of the connector structures protrudes from the end face of the ferrule;
        in the pair of the connector structures, tips of each of the multi-core fibers are pressed so that the multi-core fibers are optically connected facing each other;
        the end face of the multi-core fiber of the first connector structure is approximately flat; and
    a relation $\Delta_2 \leq 29.6/a$ is satisfied, wherein:

$\Delta_2$ (μm) is a difference between a maximum protrusion height and a minimum protrusion height from an end face of the ferrule in a reference circle at the tip of the multi-core fiber of the second connector structure;

the reference circle is a minimum circle that includes all mode field diameters of the plurality of the cores having a center of cross section of the multi-core fiber as its center; and a (μm) is a radius of the reference circle.

10. The connector structure according to claim 9, wherein one of the plurality of cores of the multi-core fiber in the second connector structure is located at the center of cross-section of the multi-core fiber; and the core that is located at the center has a protrusion height from the end face of the ferrule greater than protrusion heights of the other cores.

11. A connector connection structure using a pair of connector structures each of which comprises:

a multi-core fiber, which comprises a plurality of cores and a cladding that surrounds the cores; and a ferrule that holds the multi-core fiber; wherein a tip of the multi-core fiber of each of the pair of the connector structures protrudes from an end face of the ferrule;

in the pair of the connector structures, tips of each of the multi-core fibers are pressed so that the multi-core fibers are optically connected facing each other; and a relation $\Delta_1 + \Delta_2$ (m) ≤ 29.6/a is satisfied, wherein:

$\Delta_1$ and $\Delta_2$ are differences between a maximum protrusion height and a minimum protrusion height from an end face of the ferrule in a reference circle at the tip of the multi-core fiber of each of the pair of the connector structures;

the reference circle is a minimum circle that includes all mode field diameters of the plurality of the cores having a center of cross section of the multi-core fiber as its center; and a (μm) is a radius of the reference circle of the multi-core fiber of the pair of the connector structures.

\* \* \* \* \*